United States Patent
Bartolat

[11] 3,883,103
[45] May 13, 1975

[54] STAND FOR MACHINE TOOL GAUGE

[76] Inventor: Albert F. Bartolat, 61071 Hwy. 97, Bend, Oreg. 97701

[22] Filed: Jan. 2, 1974

[21] Appl. No.: 430,245

[52] U.S. Cl. .............................................. 248/124
[51] Int. Cl. ............................................. A47g 19/00
[58] Field of Search ...... 33/169 R, 170, 171, 172 R; 248/121, 122, 124, 158, 163, 346; 269/296

[56] References Cited
UNITED STATES PATENTS

| | | | |
|---|---|---|---|
| 2,124,006 | 7/1938 | Parker | 248/124 |
| 2,244,964 | 6/1941 | Poock et al. | 33/172 R |
| 2,310,276 | 2/1943 | Bilz | 248/124 |
| 2,469,904 | 5/1949 | Szuba | 248/124 |
| 2,687,575 | 8/1954 | Acton et al. | 33/172 R |
| 2,722,748 | 11/1955 | Triantos | 33/170 |

FOREIGN PATENTS OR APPLICATIONS 553,324   5/1943   United Kingdom .................. 33/170

Primary Examiner—Marion Parsons, Jr.
Assistant Examiner—Lawrence J. Staab
Attorney, Agent, or Firm—James D. Givnan, Jr.

[57] ABSTRACT

A stand useable in conjunction with a machine tool for supporting a work piece indicator in an immobile manner during checking of the work piece-machine tool relationship. The stand base terminates downwardly in a pair of narrow bottom edges while an arm of the base projects outwardly from the base for rested contact also with the machine tool. The arm has a lowermost edge coplanar with the aforementioned pair of edges. A post is positionable and lockable lengthwise along said base and indirectly supports the work piece indicator which indicator is of the type having a feeler contactable with the surface of the work piece. The stand is supported in a tripodal manner to assure stand immobility regardless of uneven supporting points.

1 Claim, 4 Drawing Figures

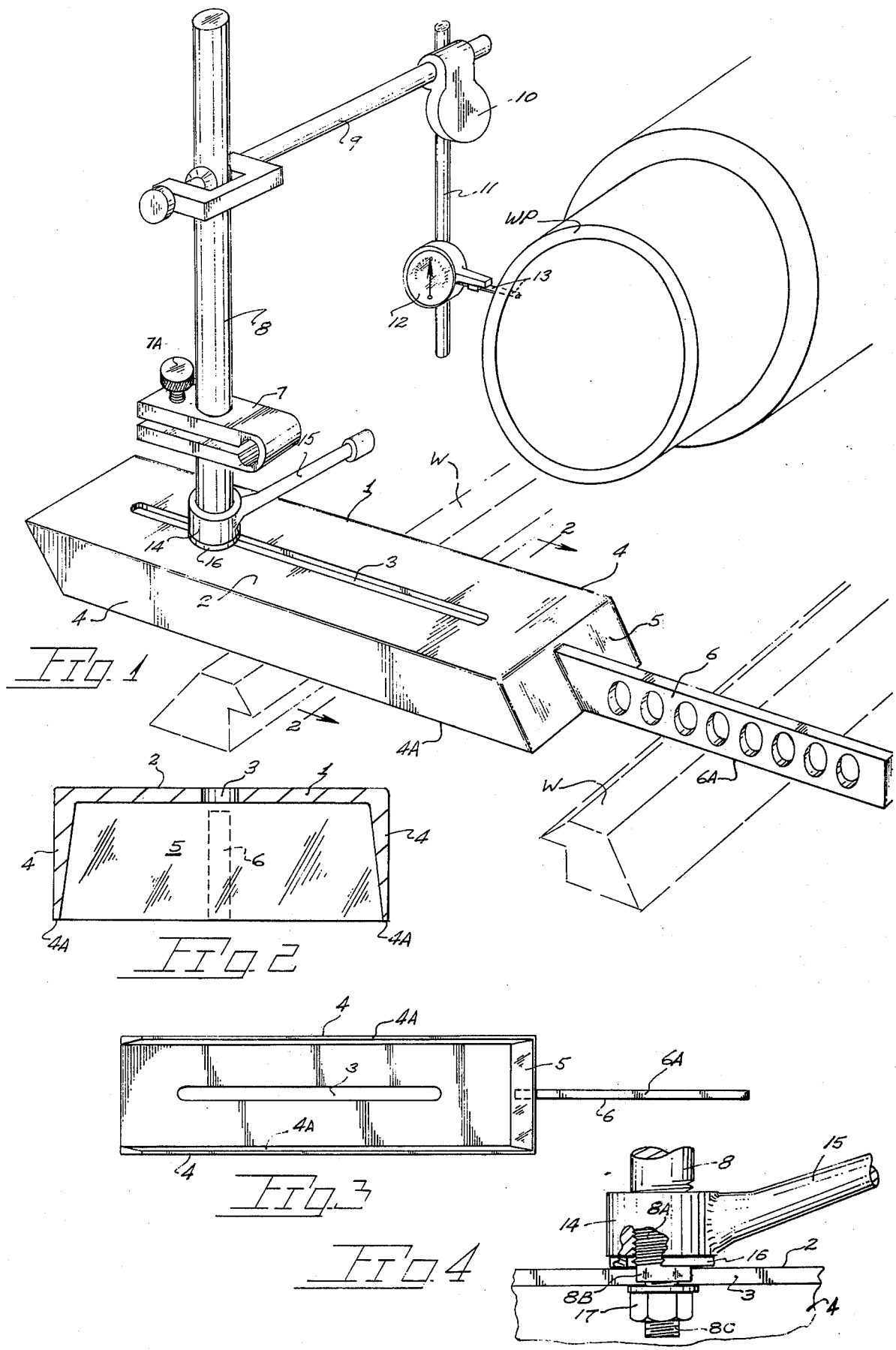

STAND FOR MACHINE TOOL GAUGE

BACKGROUND OF THE INVENTION

The present invention relates to a stand for use with machine tools such as engine lathes for supporting an indicator contactable with the work piece.

Common machine tool operation involves checking of the work piece for proper placement on or within machine tool components. One such check is that performed on a work piece chucked within a lathe for determining the concentricity of work piece surfaces with the rotation axis of the work piece, such being termed in the trade, a run-out check. The check entails the precise, immobile placement of an indicator adjacent the rotating work piece so as to permit the gauge feeler arm to ride on the moving work piece. Displacement of the feeler arm by the work piece indicates inaccurate chucking or an out-of-round work piece. Prior to initiating machining of the work piece it is desirable to test the work piece at spaced apart intervals therealong.

The prior art discloses various devices for use in conjunction with machine tools, a number of such devices being for clamped attachment to the machine tool. The primary advantage of clamping the prior art devices to said tool is to assure a stationary support for the indicator. A notable disadvantage of such clamped devices is the inconvenience encountered in repeatedly attaching and removing of same for the job at hand. Secondly, a device so clamped to a machine tool may limit the operative range of the tool.

SUMMARY OF THE INVENTION

The present invention is embodied within a stand for the stable support of an indicator having a feeler arm in contact with a work piece. The stand is highly stable by reason of it resting on three surface areas thereby having the attributes of a tripod. Further, each of the machine contacting surface areas of the stand are of minimal area to minimize the effect of minute metallic particles often found on machine tool surfaces. A mast is slidably mounted on the stand base and extends upwardly therefrom to receive an indicator support arm mounting a conventional dial indicator. The base of the stand is of sufficient weight to assure immobile resting contact with the machine tool surfaces yet permitting the stand to be readily repositioned on the machine tool to enable its use by an operator located at either side of the machine.

An important objective of the present invention is the provision of a stand for use in place on a machine tool for the support of an indicator wherein it is highly desirable that the indicator must be held immobile during checking of the work piece. To avoid the inconvenience of clamping the base to the machine tool, as is done with prior art devices, the present stand includes a base which rests on three supporting surfaces thereby avoiding any rocking tendency as could occur with a base supported adjacent each of its four corners.

An additionally important object of the invention is to provide a stand for a work piece indicator readily positionable along the bedways of a lathe machine tool for use by an operator stationed at either side of the lathe. Accordingly, the time required for precision checking the run-out of a chucked work piece is greatly reduced. Further, at completion of the run-out check the stand is removed from the bedways or carriage saddle for unhindered machine tool operation.

BRIEF DESCRIPTION OF THE DRAWING

In the accompanying drawing:

FIG. 1 is a perspective view of the stand in typical placement on the bedways of a lathe, FIG. 2 is a vertical sectional view taken along line 2—2 of FIG. 1, FIG. 3 is a bottom plan view of the stand base, and FIG. 4 is an elevational view of the lower end of the mast with a fragment of the base broken away.

DETAILED DESCRIPTION OF THE PREFERRED EMBODIMENTS

With continuing reference to the drawing wherein applied reference numerals indicate parts similarly identified in the following specification, the reference numeral 1 indicates the base of the present stand for placement upon the surface or surfaces of a machine tool. While shown and described with reference to an engine lathe, it will become obvious that the present stand is equally adaptable to other machine tools wherein precise locationing of the work piece is critical.

Base 1 is of an elongate nature having an upper surface 2 defining a lengthwise orientated opening 3. As best viewed in FIG. 3, vertical side walls at 4 depend from the surface 2 of the base. Importantly, each side wall 4 tapers downwardly to a reduced flat edge 4A which is of a reduced surface area relative to its wall 4. A segment of each reduced edge 4A constitutes a footing for base 1 when the latter is in supported placement on machine tool surfaces. An end wall at 5 closes one end of base 2. The mass of the base and reduced surface areas 4A result in relatively heavy loaded surface areas when the base is in place on a machine tool.

Extending from end wall 5 of the base 1 is an arm 6 also serving to support base 1. The lowermost surface 6A of arm 6 is coplanar with both edges 4A and, in conjunction therewith, functions as a three-point rest. Typical bedways of a lathe are shown in phantom lines at W. Arm 6 may serve as a handle and be apertured for appearance sake as well as to reduce stand weight.

It will be seen from the foregoing description of the base that an extremely stable base is provided which is not susceptible to any rocking motion as would be the case were it supported at four points wherein all four points would have to be precisely in the same plane to prevent rocking of the base. Additionally, the reduced surface areas 4A of base 1 and the reduced arm surface 5A minimize the unstabilizing effect of minute metallic shavings and particles commonly found on machine tool surfaces. It will be appreciated that metal particles between a machine tool surface and an indicator stand having a large surface area would permit rocking motion therebetween and render an erroneous indication during a run-out check on the work piece. Such rocking motion, however slight, when translated through the later described post and arm supporting arrangement results in a multiplication of any rocking motion of the base.

Slidably disposed within opening 3 is a mast 8 which adjustably supports an arm 9 in a conventional manner with a universal swivel adapter at 10 providing 360° adjustment for a rod 11 which in turn carries a dial indicator 12. Indicator 12 is positioned in the conventional manner adjacent the chucked work piece at WP to permit a feeler 13 of the indicator to ride in contact with the rotating work piece during a run-out check of the various work piece surfaces. The indicator dial, the feeler and a means supporting the indicator on mast 8 are all conventional and well known in the trade as is their use and accordingly, further details of same are dispensed with. Other types of indicator dials 12 may be utilized including those specifically intended for checking the inner periphery of work pieces. The upper end of mast 8 is supported by a fine adjustment fitting 7 of the conventional type having an adjusting screw 7A for inclining the upper half of the bifurcated fitting and hence mast 8 to permit precise contact of the feeler 13 with the work piece surface all in the well known manner.

With reference to FIG. 4 the lower end of mast 8 is threaded at 8A to receive an internally threaded ring 14 and a subjacent washer 16 bearing against surface 2 of the stand. The lowermost end of mast 8 is machined to provide a reduced or narrow portion 8B received within elongate opening 3 to prevent rotation of the mast during loosening of ring 14 by means of handgrips 15. Accordingly, arcuate travel of handgrip 15 loosens ring 14 to permit lengthwise travel of post 8 along said opening. For retention of the lower end of mast 8 in opening 3, a nut and washer assembly 17 are carried by a threaded stud 8C formed on the end of post 8.

From the foregoing description, the stand embodying the present invention provides a highly adaptable support for an indicator used in the checking of work piece relationships to a machine tool supporting same. The stand, and particularly its base, is adapted for selected, rested placement on machine tool surfaces and when so in place obviates undesired movement between stand and machine tool. Heretofore indicator supporting arrangements involved the temporary or permanent clamping of indicator support structure to a machine tool which undesirably restricted the use of the work piece indicator and in some cases, restricted the operating range of the machine tool itself. The machine tool operator is presently provided a stand readily positioned in place on the machine tool to accommodate an operator working from either side of a machine. Further, it is suitable for the checking of work pieces of a wide range of sizes.

While I have shown but one embodiment of the invention, it will be apparent to those skilled in the art that the invention may be embodied still otherwise without departing from the spirit and scope of the invention.

Having thus described the invention, what is desired to be secured under a Letters Patent is:

1. In a stand for supporting a machine tool gauge in contact with a workpiece rotatably supported in a machine tool to determine the concentricity of the mounted workpiece, the stand including a mast, an arm extending outwardly from the mast, an indicator supported by said arm and having a feeler in contact with the workpiece, the improvement comprising, a base of elongate inverted channel formation of substantial mass having downwardly extending sidewalls extending substantially the length of the base and constituting base leg members, said sidewalls tapered in a downward direction and terminating in a pair of parallel coplanar bottom edges each of reduced surface area of relatively heavy surface loading when in rested contact with the machine tool, an arm projecting outwardly from one end of said base and having a flat bottom edge coplanar with the bottom edges of said sidewalls, said flat bottom edge of the arm constituting a third edge for support of the base on the machine tool in a tripodal manner, said arm additionally serving as a handle for the stand, means mounting the lower end of the mast to said base within a lengthwise oriented opening formed in the latter enabling positioning the mast transversely relative to the axes of the rotatable workpiece, said mounting means including a hand grip in threaded attachment with said mast for advancement toward and away from said base to lock and unlock the mast in place along said opening, and said base and arm adapted to support the mast and indicator in an immobile manner regardless of minute particles intermediate said bottom edges and edge supporting machine tool surfaces.

* * * * *